US006357534B1

(12) United States Patent
Buetow et al.

(10) Patent No.: US 6,357,534 B1
(45) Date of Patent: Mar. 19, 2002

(54) BATTERY PACK LATCHING ASSEMBLY FOR FASTENER DRIVING TOOL

(75) Inventors: Robert Scott Buetow, Lake in the Hills; Larry Moeller, Mundelein; Patrick J. Driscoll, Prospect Heights; Peter D. Ploss, Gurnee, all of IL (US)

(73) Assignee: Illinois Tool Works Inc, Glenview, IL (US)

( * ) Notice: Subject to any disclaimer, the term of this patent is extended or adjusted under 35 U.S.C. 154(b) by 0 days.

(21) Appl. No.: 09/712,527

(22) Filed: Nov. 14, 2000

Related U.S. Application Data

(60) Continuation-in-part of application No. 09/329,452, filed on Jun. 10, 1999, now Pat. No. 6,179,192, which is a division of application No. 09/063,149, filed on Apr. 20, 1998, now Pat. No. 6,012,622.

(51) Int. Cl.[7] .............................. B25C 1/04; H01M 2/10

(52) U.S. Cl. ........................... 173/217; 227/8; 227/130; 310/50; 429/97

(58) Field of Search ............................ 227/8, 130, 156; 173/217, 171; 310/47, 50; 429/97, 100

(56) References Cited

U.S. PATENT DOCUMENTS

| | | | | |
|---|---|---|---|---|
| 4,050,003 A | | 9/1977 | Owings et al. | |
| 4,146,682 A | | 3/1979 | Nakao | |
| 4,483,473 A | * | 11/1984 | Wagdy | 227/8 |
| 4,504,890 A | * | 3/1985 | Chan | 200/60 |
| 4,779,687 A | | 10/1988 | Schreiber et al. | |
| 4,834,278 A | | 5/1989 | Lin | |
| 5,197,647 A | | 3/1993 | Howell | |
| 5,208,525 A | | 5/1993 | Lopic et al. | |
| 5,213,913 A | | 5/1993 | Anthony, III et al. | |
| 5,298,821 A | | 3/1994 | Michel | |
| 5,401,592 A | | 3/1995 | Gilpin et al. | |
| 5,415,955 A | | 5/1995 | Kobayashi et al. | |
| 5,553,675 A | | 9/1996 | Pitzen et al. | |
| 5,621,618 A | | 4/1997 | Komiyama | |
| 5,633,096 A | * | 5/1997 | Hattori | 429/100 |
| 5,671,815 A | * | 9/1997 | Kabatnik et al. | 310/50 |
| 5,816,121 A | * | 10/1998 | Yoshimizu et al. | 173/217 |
| 5,881,823 A | * | 3/1999 | Kabatnik et al. | 173/217 |
| 6,179,192 B1 | * | 1/2001 | Weinger et al. | 227/130 |

* cited by examiner

*Primary Examiner*—Scott A. Smith
(74) *Attorney, Agent, or Firm*—Lisa M. Soltis; Mark W. Croll; Donald J. Breh

(57) ABSTRACT

A battery pack latching or locking mounting system comprises a battery case, a cell pack disposed within the battery case, a battery cap or end closure, and a spacer which is longitudinally interposed between the cell pack and the battery cap or end closure. A first latching element or detent is mounted upon the spacer, and a second latching element or detent is mounted upon the battery cap or end closure. When the battery pack is initially mounted within the tool housing socket, the first latching element or detent of the spacer lockingly engages the single aperture defined within a side wall portion of the tool housing socket so as to lock the battery pack at its first OFF position or state. When the battery pack is moved still further into the tool housing socket in the longitudinal direction so as to be moved to the second ON position or state, the second latching element or detent of the battery cap or end closure engages the first latching element or detent of the spacer and causes the first latching element or detent of the spacer to be depressed radially inwardly so as to be disengaged from the single aperture defined within the side wall portion of the tool housing socket such that the first latching element or detent is able to be accommodated internally within tool housing socket.

32 Claims, 7 Drawing Sheets

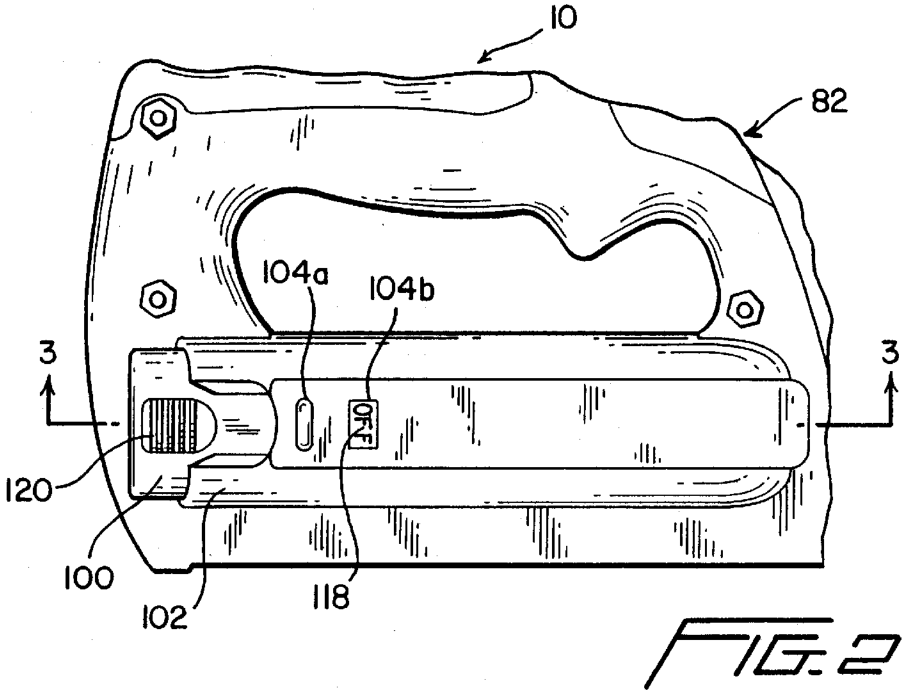
FIG. 2
FIG. 3
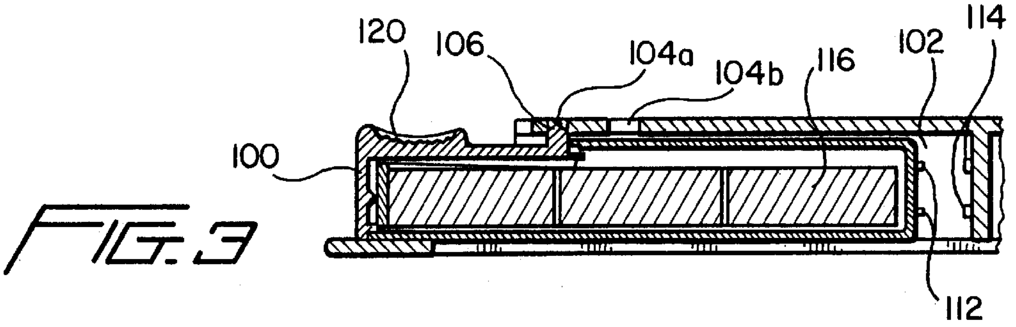
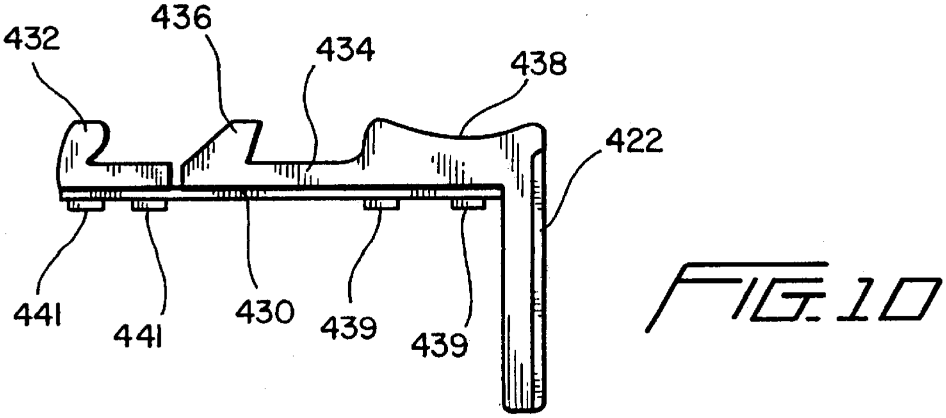
FIG. 10

BATTERY PACK LATCHING ASSEMBLY FOR FASTENER DRIVING TOOL

CROSS-REFERENCE TO RELATED PATENT APPLICATIONS

This patent application is a Continuation-In-Part (CIP) patent application of U.S. patent application Ser. No. 09/329,452 which was filed on Jun. 10, 1999, now U.S. Pat. No. 6,179,192, and which, in turn, is a divisional patent application of U.S. patent application Ser. No. 09/063,149 which was filed on Apr. 20, 1998, now U.S. Pat. No. 6,012,622.

FIELD OF THE INVENTION

The present invention relates generally to fastener driving tools, and more particularly to a new and improved battery pack latching assembly for incorporation within such fastener driving tools.

BACKGROUND OF THE INVENTION

As disclosed within the aforenoted United States Patent applications, which are hereby incorporated herein, in their entirety, by reference, portable combustion powered fastener driving tools, for use in connection with the driving of fasteners into workpieces, are of course well known. In connection with such portable combustion powered fastener driving tools, reduced cost and reduced weight are factors which are important and which are always considered in connection with the fabrication or manufacture of such tools. In view of the fact that the fastener driving tools with which we are concerned are portable fastener driving tools, the tools have self-contained power sources which include, for example, a battery pack or holder, comprising a plurality of batteries, which is necessary for providing electrical power required for the combustion process as well as for providing electrical power required for the operation of the combustion chamber fan.

One known manner or means by which the cost and weight of the fastener driving tool may be reduced is to eliminate the ON/OFF switch for the tool. Accordingly, in order to prevent unintentional operation of the tool, and to ensure the safety of both the operator as well as other job-site personnel, some operators electrically disengage the battery pack or holder which is normally held or retained within a suitable hollow portion or battery pack socket defined within the tool housing or handle. However, such electrical disengagement of the battery pack or holder from its electrical power connection mode or state within the fastener driving tool sometimes presents other operational and safety problems. When the operator is moving, such as, for example, should the operator be climbing a ladder or moving along a scaffold, the conventional loosely held disconnected battery pack or holder may become dislodged from or fall out of the tool. Consequently, this is inconvenient for the operator who must then have to retrieve the battery pack or replace the same with a different battery pack. In addition, the battery pack may be damaged, as a result of the dropping of the same, necessitating its replacement, and lastly, the fall of the battery pack may pose a potential safety hazard to other jobsite personnel within the vicinity.

Accordingly, in accordance with the disclosure, teachings, and principles as set forth within the aforenoted United States Patent applications, and as can be appreciated from FIGS. 1–3, which correspond to FIGS. 10–12 of the aforenoted patent applications, the fastener driving tool is provided with a unique battery pack or holder having separate locked operational and standby positions thereby permitting an operator to effectively turn the fastener driving tool OFF by disconnecting the battery power from the tool while simultaneously locking the battery pack or holder within the tool so as to prevent the battery pack or holder from falling out of the tool. More particularly, as best seen in FIGS. 1 and 2, the fastener driving tool is generally indicated by the reference character 10 and is seen to comprise a handle assembly which is generally indicated by the reference character 82. A hollow portion or socket member 102 is defined within a lower portion of the handle assembly 82, and a battery pack or holder 100, which is adapted to contain a plurality of batteries 116 as best seen in FIG. 3, is adapted to be movable within the hollow portion or socket member 102 of the handle 82 between separate locked operational and stand-by positions. More specifically, as best seen in FIG. 3, the fastener driving tool 10 comprises a plurality of power contacts 114 which are mounted upon the end wall of the socket member 102 opposite the entrance to the socket member 102, and the battery pack or holder 100 is similarly provided with a plurality of battery contacts 112. Obviously, the battery pack or holder 100 is shown in its stand-by position, state, or mode in FIG. 3 at which the battery contacts 112 are electrically disengaged or disconnected from the power tool contacts 114 whereby electrical power is not supplied from the batteries 116 to the tool circuitry, not shown, whereby the power tool is effectively disabled.

In order to lockingly retain the battery pack or holder 100 at either one of its operational or stand-by positions with respect to the hollow portion or socket member 102, the socket member or hollow portion 102 is provided with two apertures 104*a*,104*b*, and the battery pack or holder 100 is provided with a single detent or inherently biased tooth member 106. When the battery pack or holder 100 is initially inserted into the hollow portion or socket member 102, the tooth member 106 will initially engage itself within the first aperture 104*a*, as shown in FIG. 3, whereby the battery pack or holder 100 is therefore locked within the hollow portion or socket member 102 at the non-operational or standby position. The battery pack or holder 100 may be provided with written indicia, such as, for example, the word OFF, as designated at 118 in FIG. 2, which is adapted to be visible through aperture 104*b* whereby a visual indication to the operator of the non-operational or standby state or mode of the tool 10 is provided. When it is desired to activate the fastener driving tool 10, the operator depresses a tab 120, which is integrally connected to the biased tooth member 106, so as to cause the biased tooth member 106 to be released from the first aperture 104*a* whereupon the battery pack or holder 100 can be moved longitudinally inwardly within the hollow portion or socket member 102 until the battery pack or holder contacts 112 electrically engage the power tool contacts 114 at which time the biased tooth member 106 will also be able to be engaged within the second aperture 104*b* so as to lock the battery pack or holder 100 at its operational position or state. Suitable additional written indicia, such as, for example, the word ON, not shown, may also be provided upon the battery pack or holder 100 so as to be visible through aperture 104*a* in order to provide the operator with a visual indication that the operational state of the fastener driving tool 10 has been achieved.

As might be readily realized, the aforenoted battery pack and latching system has of course been commercially successful. In fact, such battery pack and latching system has been so successful that it is now desirable to incorporate such a battery pack and latching system into virtually all different types of portable tools. However, an implementation problem exists in connection with the incorporation of such a battery pack and latching system into existing portable tools. More particularly, existing portable tools, other than the particular tool disclosed within the aforenoted United States patent applications, do not have a pair of apertures, similar to the apertures 104*a*,104*b* provided within the aforenoted patent application tool housing, defined within their tool housings, but to the contrary, such portable tools are provided with only a single aperture for locking or latching their battery packs within their respective tools at the ON position, such tools not being provided with any means for latching or locking the battery pack upon the tool at an OFF position. Consequently, if the battery pack and latching system disclosed within the aforenoted United States patent applications were to be incorporated within the existing portable tools, a dual latching system, corresponding to the dual locked OFF and ON states of the tool, would not be able to be achieved.

More specifically, if the battery pack and latching system disclosed within the aforenoted United States patent applications were to be incorporated within the existing portable tools, only a first latched or locked OFF state would be able to be achieved for the tool by means of the single detent element or latch of the battery pack cooperating with the single aperture defined within the tool housing side wall, however, a second latched or locked ON state would not be able to be achieved in view of the fact that there is no additional or second aperture defined within the tool housing side wall for accommodating the single latch or detent element of the battery pack when the battery pack is pushed or inserted further into the tool housing socket. Alternatively, depending upon the placement or disposition of the single detent element or latch upon the battery pack, only a second latched or locked ON state would be able to be achieved for the tool by means of the single detent element or latch of the battery pack cooperating with the single aperture defined within the tool housing side wall, however, a first latched or locked OFF state would not be able to be achieved in view of the fact that there is no additional or second aperture defined within the tool housing side wall for accommodating the single latch or detent element of the battery pack when the battery pack is retracted out from the tool housing socket. Obviously, neither one of these alternative, single latched or locked dispositions or states of the battery pack, with respect to the portable tool, is desirable.

Accordingly, a need exists in the art for a dual mode battery pack latching or locking system which can be readily incorporated, in effect, in a retrofitted manner, within existing portable tools which are provided with a single locking or latching aperture such that both locked or latched ON and OFF states can be achieved in connection with such existing tools.

OBJECTS OF THE INVENTION

Accordingly, it is an object of the present invention to provide a new and improved dual state battery pack latching or locking system for incorporation within portable tools.

Another object of the present invention is to provide a new and improved dual state battery pack latching system for portable tools wherein the battery pack may be latched or locked at both its OFF and ON states within the tool housing socket.

An additional object of the present invention is to provide a new and improved dual state battery pack latching system for portable tools wherein the battery pack may be latched or locked at both its OFF and ON states within portable tool housing sockets provided with a single locking or latching aperture.

A further object of the present invention is to provide a new and improved dual state battery pack latching system for portable tools wherein the battery pack may be readily incorporated in a retrofitted manner within existing portable tool housing sockets provided with a single locking or latching aperture such that the battery pack mounted upon such existing portable tools may be latched or locked at both its OFF and ON states.

SUMMARY OF THE INVENTION

The foregoing and other objectives are achieved in accordance with the teachings and principles of the present invention through the provision of a new and improved battery pack latching or locking mounting system which comprises a battery case, a cell pack disposed within the battery case, a battery cap or end closure, and a spacer which is longitudinally interposed between the cell pack and the battery cap or end closure. A first latching element or detent is mounted upon the spacer, and a second latching element or detent is mounted upon the battery cap or end closure. When the battery pack is initially mounted within the tool housing socket, the first latching element or detent of the spacer lockingly engages the single aperture defined within a side wall portion of the tool housing socket so as to lock the battery pack at its first OFF position or state. When the battery pack is moved still further into the tool housing socket in the longitudinal direction so as to be moved to the second ON position or state, the second latching element or detent of the battery cap or end closure engages the first latching element or detent of the spacer and causes the first latching element or detent of the spacer to be depressed radially inwardly so as to be disengaged from the single aperture defined within the side wall portion of the tool housing socket such that the first latching element or detent is able to be accommodated internally within tool housing socket. In addition, the second detent or latching element of the battery cap or end closure is now permitted to engage the single aperture defined within the side wall of the tool housing socket so as to lock or latch the battery pack at the ON position or state with respect to the portable tool.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein:

FIG. 2 is a side elevational view of the handle portion of the fastener driving tool as disclosed within FIG. 1 showing the details of the single latch detent, double aperture dual ON and OFF battery pack locking or latching system for latching or locking the battery pack within the socket portion of the tool handle;

FIG. 3 is a cross-sectional view of the fastener driving tool as shown in FIG. 2 and as taken along lines 3—3 of FIG.

Figure 1:
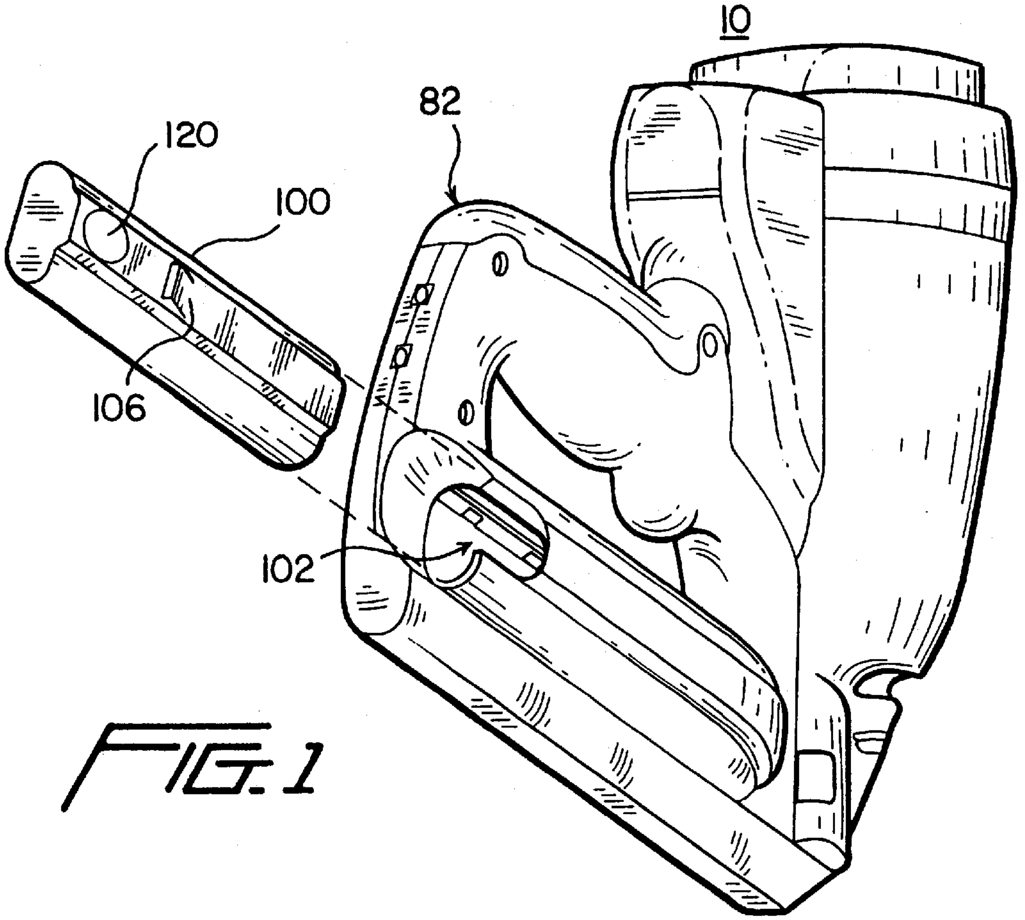
FIG. 1 is a rear perspective, exploded view of a battery pack and an existing portable fastener driving tool having a single latch detent, double aperture dual ON and OFF battery case locking or latching system incorporated therein.
Figure 9:
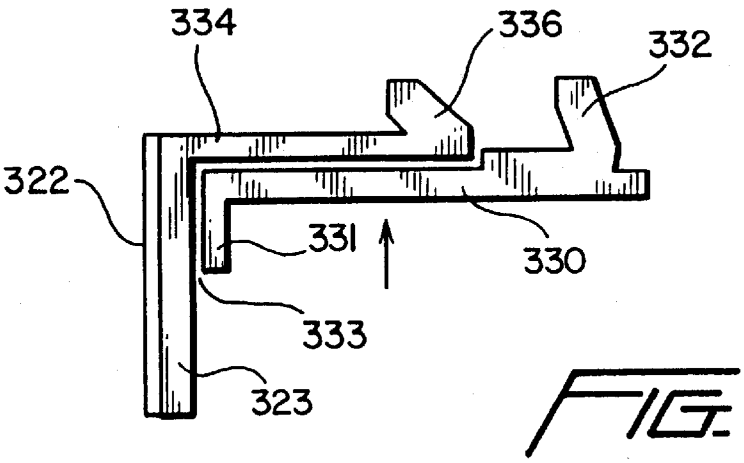
Figure 4:
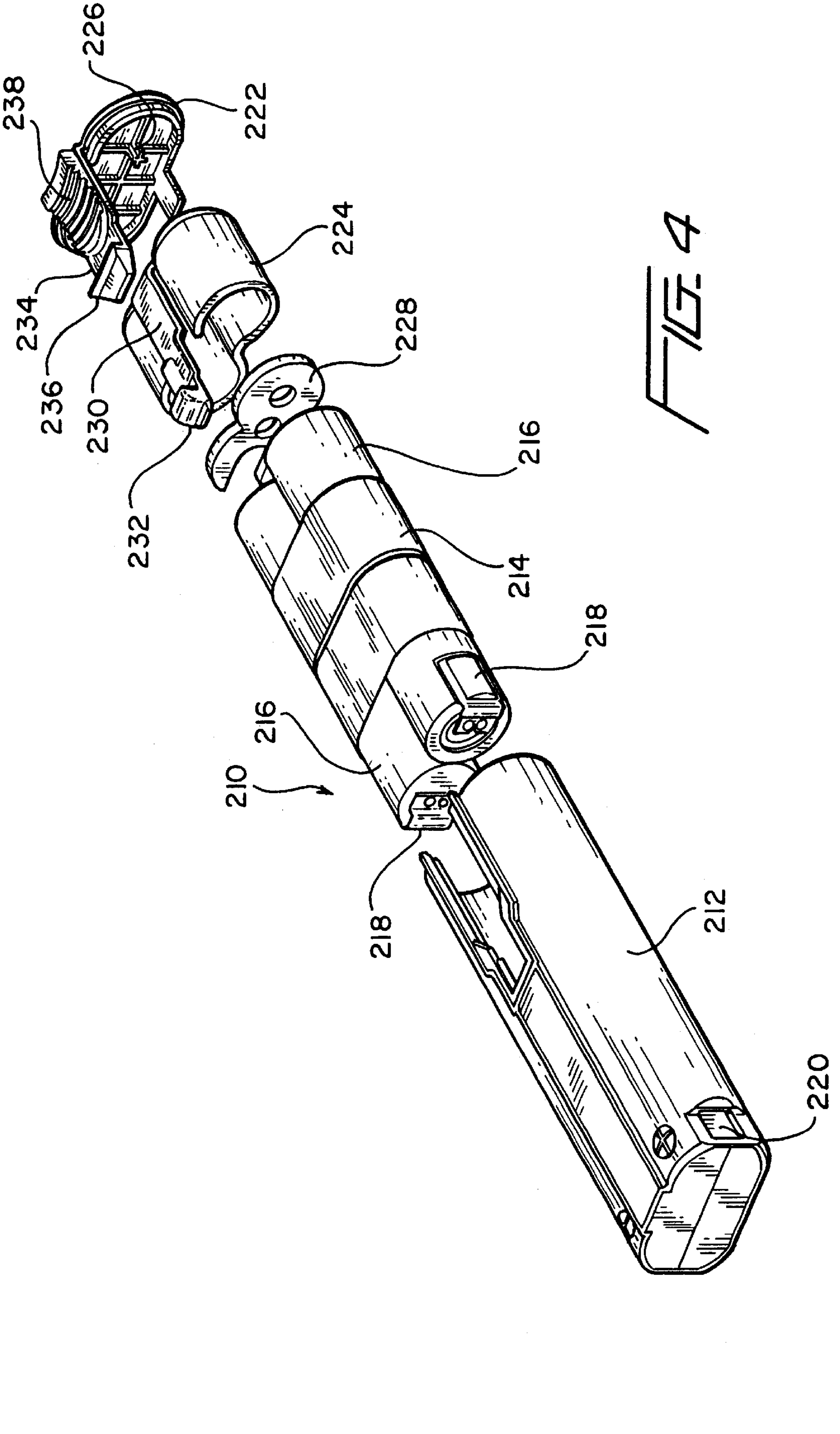
Figure 5:
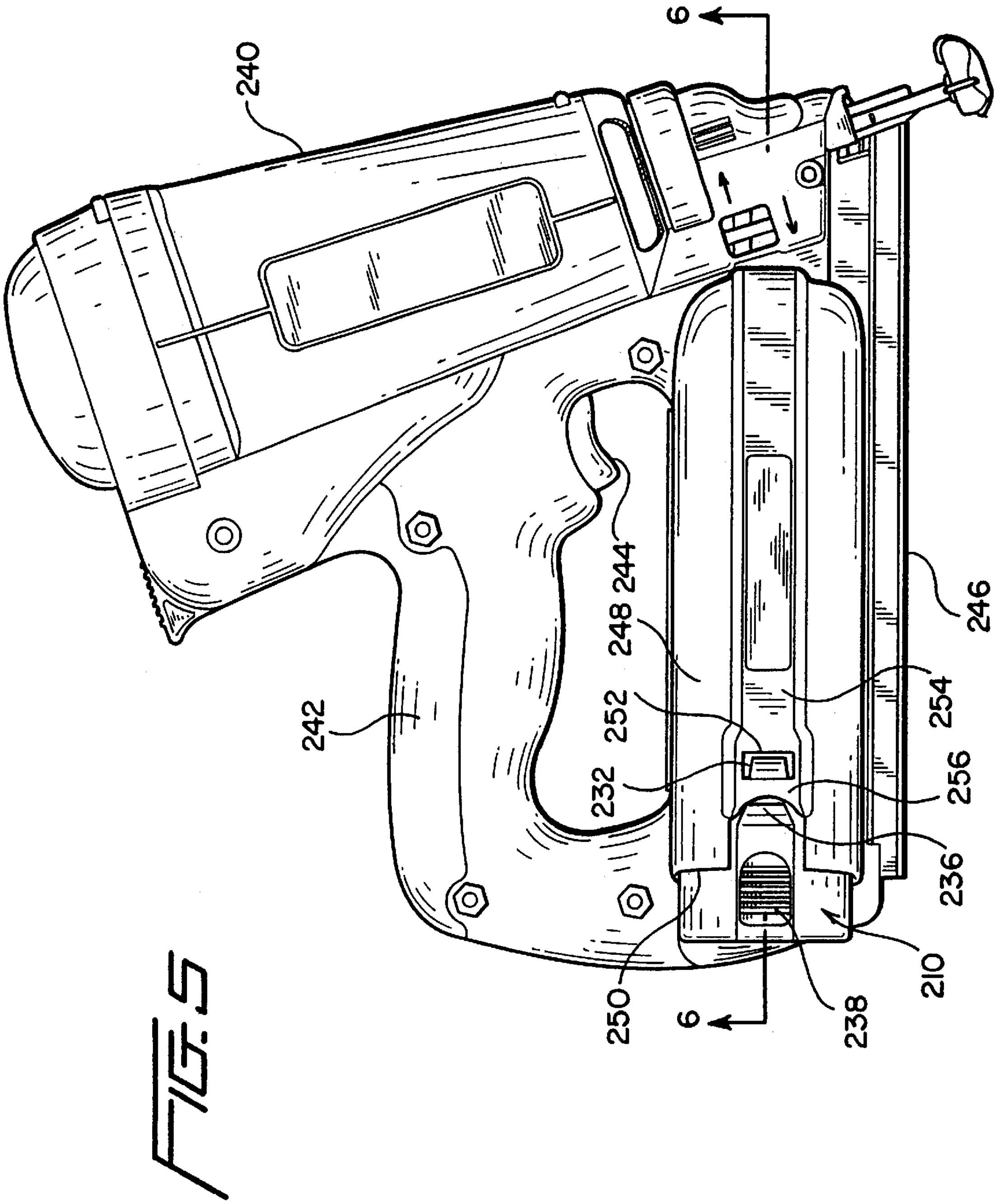
Figure 6:
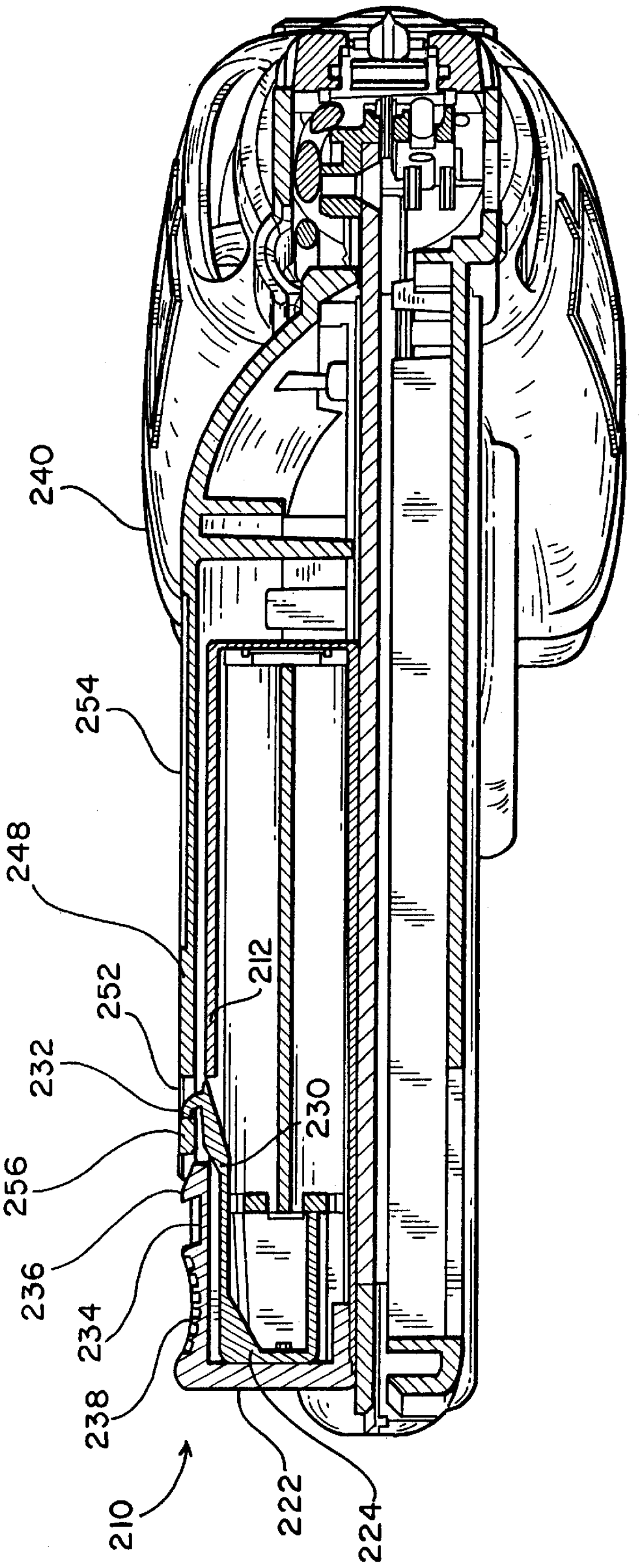
Figure 7:
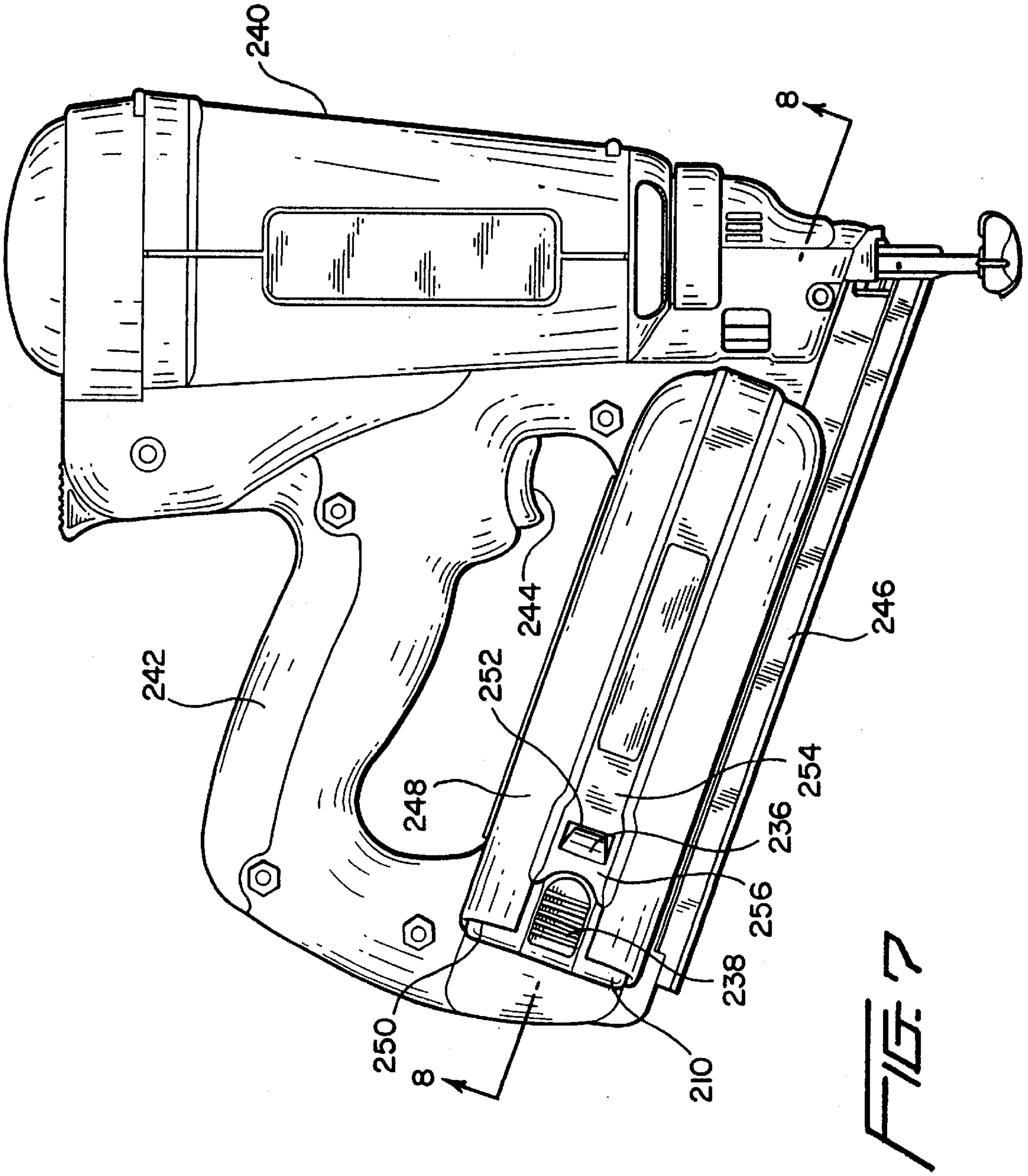
Figure 8:
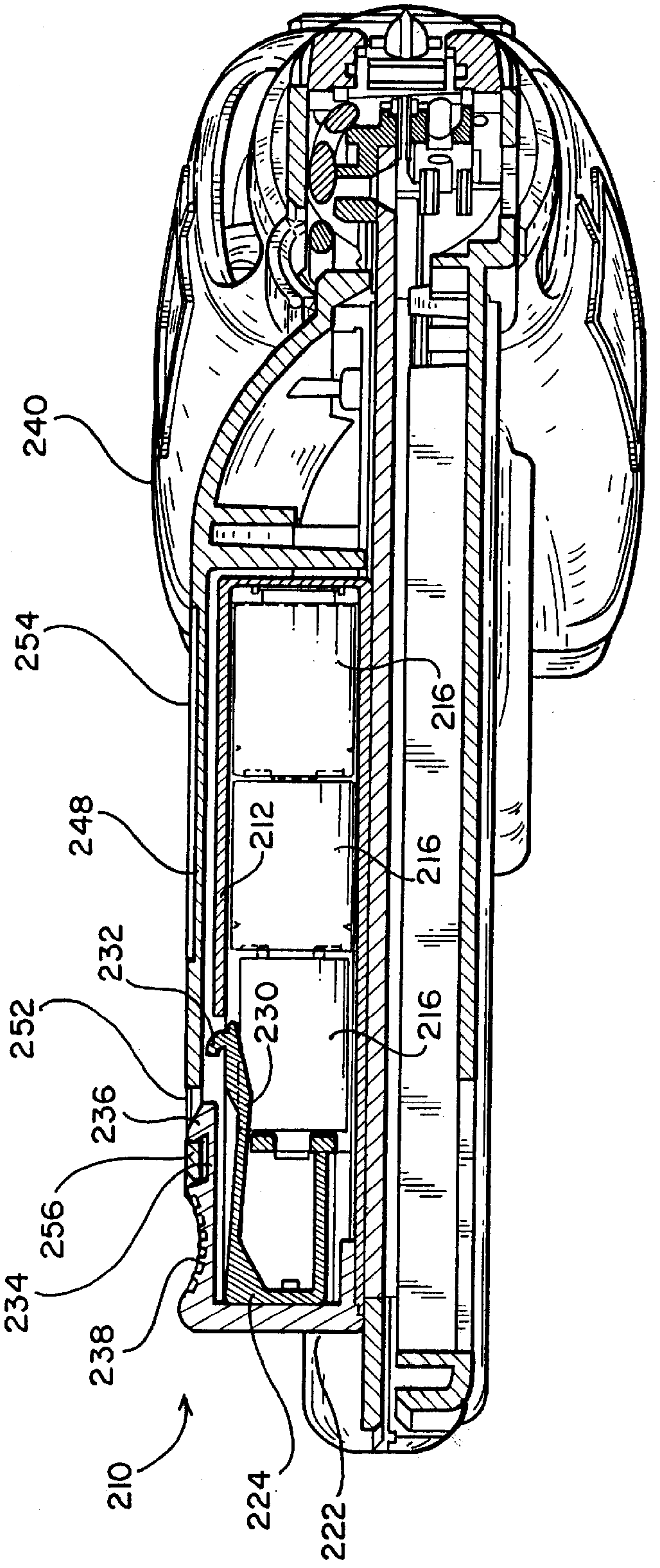

2 showing the disposition of the battery pack at its locked position or state corresponding to the OFF mode of the fastener driving tool;

FIG. 4 is an exploded perspective view of the new and improved battery pack assembly constructed in accordance with the principles and teachings of the present invention and having a pair of latching detents formed thereon for use in connection with fastener driving tools having a single latching or locking aperture;

FIG. 5 is a side elevational view of a fastener driving tool having the new and improved battery pack assembly shown in FIG. 4 mounted therein wherein the battery pack assembly is latched or locked at its standby or OFF position;

FIG. 6 is a cross-sectional view of the fastener driving tool shown in FIG. 5 as taken along lines 6—6 of FIG. 5;

FIG. 7 is a side elevational view similar to that of FIG. 5 and showing the fastener driving tool having the new and improved battery pack assembly mounted therein wherein, however, the battery pack assembly is latched or locked at its fully inserted or ON position;

FIG. 8 is a cross-sectional view of the fastener driving tool shown in FIG. 7 as taken along lines 8—8 of FIG. 7;

FIG. 9 is a schematic side elevational view of a first modified embodiment of the battery end cap illustrating a first structural arrangement by means of which both the first and second latching members can in effect be mounted upon the battery end cap; and FIG. 10 is a schematic side elevational view of a second modified embodiment of the battery end cap illustrating a second structural arrangement by means of which both the first and second latching members can also in effect be mounted upon the battery end cap.

DETAILED DESCRIPTION OF THE PREFERRED EMBODIMENT

Referring now to the drawings, and more particularly to FIG. 4 thereof, the new and improved battery pack assembly constructed in accordance with the principles and teachings of the present invention is shown and is generally indicated by the reference character 210. As shown, the battery pack assembly 210 is seen to comprise a substantially hollow battery case 212 within which there is to be accommodated a cell pack 214 which actually comprises a plurality of battery cells 216 connected together. More particularly, while two sets or rows of three battery cells 216 may be provided and connected together, in connection with some portable tools, only five battery cells 216 are required for meeting or satisfying the power requirements of the particular tool. In such case, one of the battery cells 216 is replaced by means of a dummy or spacer which has a configuration similar to that of one of the battery cells 216 such that the overall external configuration and spatial dimensions of the cell pack 214 remains the same. The laterally outer side portions of the forwardmost or longitudinally innermost pair of the battery cells 216 of the battery pack 214 are provided with electrical contacts 218 which are adapted to project laterally outwardly through windows 220, which are provided upon respective or corresponding portions of the battery case 212, such that the battery pack electrical contacts 218 will be electrically connected to corresponding electrical contacts, not shown, of the power tool when the battery pack assembly 210 is moved longitudinally inwardly within the power tool socket to the ON position or state as will be discussed hereinafter, that is, the state at which the tool will be ON. The battery pack assembly 210 further comprises a battery end cap 222 and a battery spacer 224 which is adapted to be interposed between the battery end cap 222 and the battery cell pack 214. The interior face of the battery end cap 222 is provided with a pair of laterally spaced, axially projecting posts or studs 226, only one of which is shown, and the battery spacer 224 is correspondingly provided with a pair of apertures, not shown, by means of which the battery spacer 224 may be mounted upon the interior face of the battery cap 222. In turn, the battery cap 222 is adapted to be sonically welded to the battery case 212 such that the battery pack assembly 210 is completed. In order to provide for any spatial intolerances within the assembly 210, a compressible rubber pad or spacer 228 is adapted to be interposed between the outer or rear end of the battery cell pack 214 and the battery spacer 224.

It is to be further noted that in accordance with the particularly unique structure characteristic of the present invention, it is seen that the battery spacer 224 is provided with a first arm member 230 which has a first latching member 232 disposed upon the distal end portion thereof. The proximal end portion of the first arm member 230 is integrally connected to the battery spacer 224, and in this manner, it is apparent that the first latching member 232 is in effect flexibly mounted upon the battery spacer 224 in a cantilevered manner. In a similar manner, the battery cap 222 is provided with a second arm member 234 which has a second latching member 236 disposed upon the distal end portion thereof. The proximal end portion of the second arm member 234 is integrally connected to the battery cap 222, and in this manner, it is apparent that the second latching member 236 is in effect likewise flexibly mounted upon the battery cap 222 in a cantilevered manner. It is to be further noted that when the battery spacer 224 is mounted upon the battery cap 222 as a result of the posts or studs 226 projecting through the apertures, not shown, of the battery spacer 224, the second arm member 234 will overlie the first arm member 230. The second arm member 234 is further provided with a recessed or concave finger member 238 by means of which, as will be more fully discussed hereinafter, not only can the battery pack assembly 210 can be manipulated in both the forward or insertion direction, and the rearward or retraction direction, with respect to the socket portion of the fastener driving tool, but in addition, the second arm member 234 can be depressed downwardly, due to flexible cantilevered mounting thereof upon the battery end cap 222, so as to engage the first arm member 230. As a result of such downward depression and flexible movement of the second arm member 234, the engagement of the second arm member 234 with the first arm member 230, and the flexible cantilevered movement or mounting of the first arm member 230 upon the battery spacer 224, the first latching member 232 can be disengaged from the aperture formed within the sidewall portion of the socket portion of the fastener driving tool so as to permit the battery pack assembly 210 to be moved still further into the socket portion of the fastener driving and permit the second latching member 236 to lockingly engage the aperture formed within the sidewall portion of the socket portion of the fastener driving tool.

More particularly, with reference now being made to FIG. 5, and as best seen from such view, a typical fastener driving tool currently in existence is shown at 240, and it is seen that the tool 240 comprises, for example, among other components thereof, a handle portion 242 having a trigger mechanism 244, and a base portion 246 within which there is integrally defined a hollow socket portion 248. As can be appreciated, the hollow socket portion 248 is provided with an open end region 250 into which the portable battery pack assembly 210 is adapted to be inserted. As shown in FIG. 5, the battery pack assembly 210 is illustrated as being disposed within the socket portion 248 of the fastener driving tool 240 such that the battery pack assembly 210 is lockingly engaged or latched at its OFF position, that is, the position at which the electrical contacts 218 of the battery pack assembly 210 will be electrically disconnected from the electrical contacts, not shown, of the fastener driving tool 240 such that the tool 240 will be disposed in its OFF state.

More particularly, it is seen that the hollow socket portion 248 of the fastener driving tool 240 is provided with a single aperture 252 defined within a sidewall portion 254 of the socket portion 248 which is adapted to be latchingly or lockingly engaged by means of the first latching member 232 when the battery pack assembly 210 has been inserted into the socket portion 248 of the fastener driving tool 240 so as to be disposed at the OFF position. This state can be further appreciated with reference being additionally made to FIG. 6 wherein the disposition of the two latching members 232 and 236 relative to the socket portion 248 of the fastener driving tool 240, and in particular the aperture 252 thereof, are disposed. It is additionally seen that the sidewall portion 254 of the hollow socket portion 248 of the fastener driving tool 240 includes a transversely extending wall portion 256 which is longitudinally or axially recessed from the open end region 250, and that the longitudinal or axial dimension of such wall portion 256 corresponds approximately to the longitudinal or axial distance defined between the first and second latching members 232, 236 when the portable battery pack assembly 210 is assembled. In this manner, when the portable battery pack assembly 210 is mounted within the socket portion 248 of the fastener driving tool 240 at its OFF position or state, the first latching member 232 will be disposed upon a first or downstream side of the wall portion 256 while the second latching member 236 will be disposed upon a second or opposite upstream side of the wall portion 256.

When it is desired to provide electrical power to the fastener driving tool 240 so as to dispose the same in the ON state, the battery pack assembly 210 is moved longitudinally or axially further into the hollow socket portion 248 of the fastener driving tool 240 to the positions shown in FIGS. 7 and 8 at which the electrical contacts 218 of the battery pack assembly 210 can electrically engage the electrical power contacts, not shown, of the fastener driving tool 240. More particularly, as can be appreciated with reference also still being made to FIGS. 5 and 6, in order to achieve such longitudinal or axial movement of the battery pack assembly 210 with respect to the hollow socket portion 248 of the fastener driving tool 240, an operator's finger is disposed within or upon the recessed finger portion 238 of the battery end cap 222, and the recessed finger portion 238 is then depressed downwardly as viewed in FIG. 6. As a result of such downward depression of the recessed finger portion 238, and as a result of the flexibility of the second arm member 234 due to its cantilevered mounting upon the battery end cap 222, the second arm member 234, which is integral with the recessed finger portion 238 and which likewise has the second latching member 236 integrally formed thereon, is likewise caused to be depressed or moved downwardly such that the bottom or undersurface of the second arm member 234 engages the upper surface of the first arm member 230. As a result of such engagement between the first and second arm members 230,234, as well as the flexibility of the first arm member 230 due to its cantilevered mounting upon the battery spacer 224, the first arm member 230 is depressed or moved downwardly whereby the first locking or latching member 232 is able to be disengaged or freed from the aperture 252 and its engagement with the wall portion 256. Consequently, the battery pack assembly 210 is enabled to be moved longitudinally or axially forwardly further into the hollow socket portion 248 of the fastener driving tool 240 such that the battery pack assembly contacts 218 can make electrical contact with the electrical contacts, not shown, of the fastener driving tool 240 and thereby provide electrical power to the fastener driving tool 240.

As can readily be appreciated from reference being made to FIGS. 7 and 8, and in particular, in connection with FIG. 8 when particularly compared to FIG. 6, it is seen that as a result of the downward depression of the second arm member 234 and its consequent engagement with the first arm member 230 whereby the first latching member 232 will be disengaged from the aperture 252 formed within the sidewall 254 of the fastener driving tool socket portion 248, the battery pack assembly 210 is then enabled to be moved longitudinally or axially inwardly into the socket portion 248 of the fastener driving tool 240 so as to effectively move the battery pack assembly 210 from the OFF or standby state, position, or mode, to the ON state, position, or mode. It is further appreciated upon comparison between the illustrated structure of FIGS. 6 and 8 that in lieu of the first latching member 232 projecting outwardly from the battery case 212 so as to be properly engaged within the aperture or window 252 of the fastener driving tool socket portion 248, the first latching member 232 is now depressed radially inwardly and is accommodated between the outermost pair of laterally spaced power cells 216. This spatial accommodation of the first latching member 232 permits the first latching member 232 to also be accommodated internally within the socket portion 248 of the fastener driving tool 240 as is clearly seen in FIG. 6.

Concomitantly, upon further longitudinal or axial movement of the battery pack assembly 210 within the socket portion 248 of the fastener driving tool 240, the second latching member 236 is permitted to move beneath the transversely disposed wall portion 256 and be snap fitted within the aperture or window 252 formed within the sidewall portion 254 of the socket portion 248 of the fastener driving tool 240 so as to be disposed upon or engage the first or downstream side of the wall portion 256. At this time, the battery pack assembly 210 is lockingly engaged at the position or state within the socket portion 248 of the fastener driving tool 240 corresponding to the ON state of the tool, and it is likewise noted that the recessed finger portion 238 of the battery pack assembly 210 is disposed upon or engaged with the second or upstream side of the transversely extending wall portion 256. In order to move the battery pack assembly 210 back to its position corresponding to the OFF state of the fastener driving tool 240, a suitable tool, not shown, can be inserted through the aperture or window 252 formed within the sidewall portion 254 of the socket portion of the tool 240 so as to force or depress the second latching member 236 radially inwardly and thereby disengage the same from its engaged state with the transversely extending wall 256. Rearward slidable movement of the battery pack assembly 210, by means of an operator's finger operatively engaged upon the recessed finger portion 238, is then able to be achieved.

With reference now being made to FIG. 9, a first modified embodiment of a battery end cap assembly is disclosed, and it is to be noted that component parts of the battery end cap assembly which correspond to those component parts of the end cap assembly shown in FIG. 4 will be designated by corresponding reference characters except that they will be within the 300 series. The significant difference between the battery end cap assembly of the embodiment illustrated in FIG. 9, as compared to the battery end cap assembly illustrated in FIG. 4 resides in the fact that both the first and second latching members are now mounted upon the battery end cap as opposed to the first latching member 232 being mounted upon the battery spacer 224 while the second latching member 236 was mounted upon the battery end cap 222 as was the case with the embodiment of FIG. 4. More particularly, the battery end cap assembly of the embodiment of FIG. 9 is seen to comprise the battery end cap 322 which has a first arm member 334 integrally mounted thereon in a cantilevered manner. The distal end of the first arm member 334 is provided with a first latching member 336, and a second arm member 330 is adapted to be fixedly secured to an interior surface 323 of the battery end cap 322 in a cantilevered manner by means of a dependent bracket end portion 331 integral with the second arm member 330 whereby the second arm member 330 is in effect disposed beneath the first arm member 334. The distal end of the second arm member 330 is provided with a second latching member 332, and in view of the fixation of the second arm member 330 to the battery end cap 322 only by means of the bracket end portion 331 of the second arm member 330, the second arm member 330 is able to be flexibly and resiliently moved with respect to the first arm member 334. The bracket end portion 331 of the second arm member 330 may be fixed to the battery end cap by any suitable means, such as being ultrasonically welded to the battery end cap 322 as at 333, and the resulting battery end cap assembly, with its latching members 332, 336, functions in a manner similar to that of the latching members 232,236 of the embodiment shown in FIG. 4. Accordingly, a further detailed description is submitted to be unnecessary and is therefore omitted herefrom.

With reference now being made to FIG. 10, a second modified embodiment of a battery end cap assembly is disclosed, and it is to be noted that component parts of the battery end cap assembly which correspond to those component parts of the end cap assembly shown in FIGS. 4 and 9 will be designated by corresponding reference characters except that they will be within the 400 series. As was the case noted with respect to the embodiments of FIGS. 4 and 9, again, the significant difference between the battery end cap assembly of the embodiment illustrated in FIG. 10, as compared to the battery end cap assembly illustrated in FIG. 4, resides in the fact that both the first and second latching members are now mounted upon the battery end cap as opposed to the first latching member 232 being mounted upon the battery spacer 224 while the second latching member 236 was mounted upon the battery end cap 222 as was the case with the embodiment of FIG. 4.

More particularly, the battery end cap assembly of the embodiment of FIG. 10 is seen to comprise the battery end cap 422 which has an arm member 434 integrally mounted thereon in a cantilevered manner, and the distal end portion of the arm member 434 is provided with a first latching member 436. A second mounting arm or mounting plate 430, which may, for example, be in the form of a leaf spring, has a first proximal end portion thereof fixedly mounted to an underside portion of the arm member 434 at locations adjacent to the end cap 422 by means of suitable fasteners, such as, for example, rivets 439, while a distal end portion of the mounting plate 430 has a second latching member 432 mounted thereon by similar rivet fasteners 441. In this manner, the mounting plate 430 is freely flexibly mounted upon the undersurface portion of the arm member 434 in a cantilevered manner such that the first and second latching members 436, 432 are able to function and achieve their latching operations as desired. Again, the operations of such latching members 432,436 is submitted to be apparent and therefore a detailed description of such operations is deemed unnecessary and is accordingly omitted herefrom.

Thus, it may be seen that in accordance with the teachings and principles of the present a new and improved battery pack latching or locking mounting system has been developed wherein first and second latching elements or detents mounted upon the battery spacer battery end cap engage a single aperture or window defined within a sidewall portion of the tool housing socket so as to lock the battery pack at its first OFF position or state and its second ON state or position. When the battery pack is moved into the tool housing socket in the longitudinal direction so as to be moved from the first OFF position or state to the second ON position or state, the second latching element or detent of the battery cap or end closure engages the first latching element or detent of the spacer and causes the first latching element or detent of the spacer to be depressed radially inwardly so as to be disengaged from the single aperture or window defined within the sidewall portion of the tool housing socket such that the first latching element or detent is able to be accommodated internally within tool housing socket. In addition, the second detent or latching element of the battery cap or end closure is now permitted to engage the single aperture or window defined within the sidewall of the tool housing socket so as to lock or latch the battery pack at the ON position or state with respect to the portable tool.

Obviously, many variations and modifications of the present invention are possible in light of the above teachings. It is therefore to be understood that within the scope of the appended claims, the present invention may be practiced otherwise than as specifically described herein.

WHAT IS CLAIMED AS NEW AND DESIRED TO BE PROTECTED BY LETTERS PATENT OF THE UNITED STATES OF AMERICA, IS:

1. A battery pack assembly for use within a portable tool, comprising:

a battery case;

at least one battery power cell disposed internally within said battery case;

electrical contacts disposed upon said battery pack assembly for electrical connection to electrical power contacts mounted upon the portable tool; and a dual latching detent system, comprising first and second latching detents for operative cooperation with a single window aperture of the portable tool, mounted upon said battery case for respectively lockingly latching said battery pack assembly at first and second positions upon the portable tool such that when said first latching detent is engaged with the single window aperture of the portable tool so as to lockingly latch said battery pack assembly at said first position, said electrical contacts of said battery pack assembly will be electrically disengaged from the power contacts of the portable tool whereby the portable tool will be disposed in an OFF state, whereas when said second latching detent is engaged with the single window aperture of the portable tool so as to lockingly latch said battery pack assembly at said second position, said electrical contacts of said battery pack assembly will be electrically engaged with the power contacts of the portable tool whereby the portable tool will be disposed in an ON state.

2. The battery pack assembly as set forth in claim 1, wherein:

said dual latching detent system comprises first and second flexible cantilevered arms; and said first and second latching detents are respectively mounted upon distal end portions of said first and second flexible cantilevered arms.

3. The battery pack assembly as set forth in claim 2, wherein:

said second flexible cantilevered arm is disposed radially outwardly with respect to said first flexible cantilevered arm such that radially inward movement of said second flexible cantilevered arm causes radially inward movement of said first flexible cantilevered arm so a s to disengage said first latching detent from the single window aperture of the portable tool and permit said second latching detent to engage the single window aperture of the portable tool.

4. The battery pack assembly as set forth in claim 3, wherein:

said second flexible cantilevered arm has a recessed finger portion for receiving an operator's finger so as to facilitate said radially inward movement of said second flexible cantilevered arm with respect to said first flexible cantilevered arm and to facilitate movement of said battery pack assembly from said first position to said second position.

5. The battery pack assembly as set forth in claim 2, further comprising:

a battery pack end cap; and a battery spacer interposed between said battery pack end cap and said at least one battery power cell, said first and second flexible cantilevered arms being respectively integrally mounted upon said battery spacer and said battery pack end cap.

6. The battery pack assembly as set forth in claim 5, wherein:

at least one mounting stud is integrally mounted upon said battery pack end cap for mounting said battery spacer thereon; and said battery pack end cap is sonically welded to said battery case.

7. The battery pack assembly as set forth in claim 2, further comprising:

a battery end cap;

said first and second flexible cantilevered arms are both mounted upon said battery end cap.

8. The battery pack assembly as set forth in claim 7, wherein:

said first one of said first and second cantilevered arms is integral with said battery end cap; and said second one of said first and second cantilevered arms is ultrasonically welded to said battery end cap.

9. The battery pack assembly as set forth in claim 7, wherein:

said first one of said first and second cantilevered arms is integral with said battery end cap; and said second one of said first and second cantilevered arms is riveted to said first one of said first and second cantilevered arms.

10. In combination with a portable tool, a battery pack assembly adapted to be mounted upon said portable tool, comprising:

a battery case;

at least one battery cell disposed internally within said battery case;

electrical contacts disposed upon said battery pack assembly for electrical connection to electrical power contacts mounted upon said portable tool; and a dual latching detent system, comprising first and second latching detents for operative cooperation with a single window aperture of said portable tool, mounted upon said battery case for respectively lockingly latching said battery pack assembly at first and second positions upon said portable tool such that when said first latching detent is engaged with said single window aperture of said portable tool so as to lockingly latch said battery pack assembly at said first position, said electrical contacts of said battery pack assembly will be electrically disengaged from said power contacts of said portable tool whereby said portable tool will be disposed in an OFF state, whereas when said second latching detent is engaged with said single window aperture of said portable tool so as to lockingly latch said battery pack assembly at said second position, said electrical contacts of said battery pack assembly will be electrically engaged with said power contacts of said portable tool whereby said portable tool will be disposed in an ON state.

11. The combination as set forth in claim 10, wherein:

said dual latching detent system comprises first and second flexible cantilevered arms; and said first and second latching detents are respectively mounted upon distal end portions of said first and second flexible cantilevered arms.

12. The combination as set forth in claim 11, wherein:

said second flexible cantilevered arm is disposed radially outwardly with respect to said first flexible cantilevered arm such that radially inward movement of said second flexible cantilevered arm causes radially inward movement of said first flexible cantilevered arm so as to disengage said first latching detent from the single window aperture of the portable tool and permit said second latching detent to engage the single window aperture of the portable tool.

13. The combination as set forth in claim 12, wherein:

said second flexible cantilevered arm has a recessed finger portion for receiving an operator's finger so as to facilitate said radially inward movement of said second flexible cantilevered arm with respect to said first flexible cantilevered arm and to facilitate movement of said battery pack assembly from said first position to said second position.

14. The combination as set forth in claim 11, further comprising:

a battery pack end cap; and a battery spacer interposed between said battery pack end cap and said at least one battery power cell, said first and second flexible cantilevered arms being respectively integrally mounted upon said battery spacer and said battery pack end cap.

15. The combination as set forth in claim 14, wherein:

at least one mounting stud is integrally mounted upon said battery pack end cap for mounting said battery spacer thereon; and said battery pack end cap is sonically welded to said battery case.

16. The combination as set forth in claim 11, further comprising:

a battery end cap;

said first and second flexible cantilevered arms are both mounted upon said battery end cap.

17. The combination as set forth in claim 16, wherein:

said first one of said first and second cantilevered arms is integral with said battery end cap; and said second one of said first and second cantilevered arms is ultrasonically welded to said battery end cap.

18. The combination as set forth in claim 16, wherein:

said first one of said first and second cantilevered arms is integral with said battery end cap; and said second one of said first and second cantilevered arms is riveted to said first one of said first and second cantilevered arms.

19. The combination as set forth in claim 10, wherein:

said portable tool comprises a hollow socket portion within which said battery pack assembly is adapted to be disposed; and said single window aperture is defined within a sidewall portion of said hollow socket portion of said portable tool.

20. The combination as set forth in claim 19, wherein:

said first latching detent is disposed internally within said hollow socket portion when said second latching detent is engaged with said single window aperture defined within said sidewall portion of said hollow socket portion.

21. The combination as set forth in claim 10, wherein:

said portable tool comprises a fastener driving tool.

22. A portable tool, comprising:

a hollow socket portion having a single window aperture defined within a sidewall portion of said hollow socket portion; and a battery pack assembly adapted to be mounted within said hollow socket portion of said tool;

said battery pack assembly comprising a battery case; at least one battery cell disposed internally within said battery case; electrical contacts disposed upon said battery pack assembly for electrical connection to electrical power contacts mounted upon said portable tool; and a dual latching detent system, comprising first and second latching detents for operative cooperation with said single window aperture of said hollow socket portion of said portable tool, mounted upon said battery case for respectively lockingly latching said battery pack assembly at first and second positions within said hollow socket portion of said portable tool such that when said first latching detent is engaged with said single window aperture of said socket portion of said portable tool so as to lockingly latch said battery pack assembly at said first position, said electrical contacts of said battery pack assembly will be electrically disengaged from said power contacts of said portable tool whereby said portable tool will be disposed in an OFF state, whereas when said second latching detent is engaged with said single window aperture of said hollow socket portion of said portable tool so as to lockingly latch said battery pack assembly at said second position, said electrical contacts of said battery pack assembly will be electrically engaged with said power contacts of said portable tool whereby said portable tool will be disposed in an ON state.

23. The tool as set forth in claim 22, wherein:

said dual latching detent system comprises first and second flexible cantilevered arms; and said first and second latching detents are respectively mounted upon distal end portions of said first and second flexible cantilevered arms.

24. The tool as set forth in claim 23, wherein:

said second flexible cantilevered arm is disposed radially outwardly with respect to said first flexible cantilevered arm such that radially inward movement of said second flexible cantilevered arm causes radially inward movement of said first flexible cantilevered arm so as to disengage said first latching detent from the single window aperture of the portable tool and permit said second latching detent to engage the single window aperture of the portable tool.

25. The tool as set forth in claim 24, wherein:

said second flexible cantilevered arm has a recessed finger portion for receiving an operator's finger so as to facilitate said radially inward movement of said second flexible cantilevered arm with respect to said first flexible cantilevered arm and to facilitate movement of said battery pack assembly from said first position to said second position.

26. The tool as set forth in claim 23, further comprising:

a battery pack end cap; and a battery spacer interposed between said battery pack end cap and said at least one battery power cell, said first and second flexible cantilevered arms being respectively integrally mounted upon said battery spacer and said battery pack end cap.

27. The tool as set forth in claim 26, wherein:

at least one mounting stud is integrally mounted upon said battery pack end cap for mounting said battery spacer thereon; and said battery pack end cap is sonically welded to said battery case.

28. The tool as set forth in claim 23, further comprising:

a battery end cap;

said first and second flexible cantilevered arms are both mounted upon said battery end cap.

29. The combination as set forth in claim 28, wherein:

said first one of said first and second cantilevered arms is integral with said battery end cap; and said second one of said first and second cantilevered arms is ultrasonically welded to said battery end cap.

30. The combination as set forth in claim 28, wherein:

said first one of said first and second cantilevered arms is integral with said battery end cap; and said second one of said first and second cantilevered arms is riveted to said first one of said first and second cantilevered arms.

31. The tool as set forth in claim 22, wherein:

said portable tool comprises a fastener driving tool.

32. The tool as set forth in claim 22, wherein:

said first latching detent is disposed internally within said hollow socket portion when said second latching detent is engaged with said single window aperture defined within said sidewall portion of said hollow socket portion.

* * * * *